United States Patent [19]

Katayama et al.

[11] Patent Number: 4,944,951

[45] Date of Patent: Jul. 31, 1990

[54] TIRE LOADING MECHANISM OF A TIRE COOLER FOR A TIRE VULCANIZING MACHINE

[75] Inventors: Hideaki Katayama; Akira Hasegawa; Katsuyoshi Sakaguchi, all of Nagasaki, Japan

[73] Assignee: Mitsubishi Jukogyo Kabushiki Kaisha, Tokyo, Japan

[21] Appl. No.: 359,717

[22] Filed: May 31, 1989

[30] Foreign Application Priority Data

Jun. 6, 1988 [JP] Japan ................................ 63-137219

[51] Int. Cl.$^5$ .............................................. B29C 35/16
[52] U.S. Cl. ...................................... 425/58.1; 425/40
[58] Field of Search ........................... 425/58.1, 40, 38

[56] References Cited

U.S. PATENT DOCUMENTS

| | | | |
|---|---|---|---|
| 2,340,191 | 1/1944 | Kuhlke | 425/38 |
| 3,605,182 | 9/1971 | Ulm | 425/58.1 |
| 4,092,090 | 5/1978 | Yuhas et al. | 425/58.1 |
| 4,124,337 | 11/1978 | Martin | 425/58.1 |

*Primary Examiner*—Willard Hoag
*Attorney, Agent, or Firm*—Wenderoth, Lind & Ponack

[57] ABSTRACT

An improved tire loading mechanism of a tire cooler in a tire vulcanizing machine is proposed to save time and human labor, to prevent jamming of a screw portion and to enhance economy of the machine. The tire loading mechanism is composed of a main shaft pivotably supported from a rotary table and rotationally driven by a drive source, an outer cylinder mounted to the main shaft so as to be relatively displaceable in an axial direction via screw threads and having an upper bead ring support flange at its lower end, and a housing mounted to the lower end of the main shaft via disengageably fitting claws and having a lower bead ring support flange at its upper end. A disengageable fitting rod for stopping rotation of the outer cylinder is provided on the rotary table at a position opposed to a vertical groove on the surface of the outer cylinder. An arrangement provided between the main shaft and the outer cylinder fixedly secures the outer cylinder to the main shaft upon rotational air cooling of the tire. Such arrangement essentially includes an elastic ring on the outer circumference of the main shaft which is pneumatically expanded to be pressed against the inner circumference of the outer cylinder.

2 Claims, 1 Drawing Sheet

TIRE LOADING MECHANISM OF A TIRE COOLER FOR A TIRE VULCANIZING MACHINE

BACKGROUND OF THE INVENTION

1. Field of the Invention:

The present invention relates to a tire loading mechanism of a tire cooler, referred to as a post cure inflater (PCI), for a tire vulcanizing machine.

2. Description of the Prior Art:

The known tire cooler of the type generally called PCI operates to receive a tire vulcanized by a tire vulcanizing machine and to cool the tire while inflating it by air. During operation of such tire cooler, the following features are to be noted:

(1) Locking and unlocking of a vulcanized tire to and from the cooler are effected by means of a lever driven by a pneumatic cylinder.

(2) Adjustment of bead heights is carried out by manually adjusting an interval between clamp portions by means of screws in accordance with a thickness of a tire, but frequently, these screws become fixedly jammed by a tar-like substance exuded from the tire.

(3) Sometimes it is required to rotate a tire in the running direction during the cooling operation, and such operation is achieved by a motor-powered reduction gear.

SUMMARY OF THE INVENTION

It is therefore one object of the present invention to provide an improved tire loading mechanism of a tire cooler for a tire vulcanizing machine, in which manual labor and time spent for adjustment of bead heights can be saved, jamming of a screw portion can be prevented and economy of the machine is enhanced.

According to one feature of the present invention, there is provided a tire loading mechanism of a tire cooler for a tire vulcanizing machine, comprising a main shaft pivotably supported from a rotary table and rotationally driven by a drive source, an outer cylinder mounted to the main shaft so as to be relatively displaceable in an axial direction via screw threads and having an upper bead ring support flange at its lower end, a housing mounted to the lower end of the main shaft via disengageably fitting claws and having a lower bead ring support flange at its upper end, a disengageably fitting rod for stopping rotation of the outer cylinder, that is provided on the rotary table at a position opposed to a vertical groove on the surface of the outer cylinder, and means provided between the main shaft and the outer cylinder for fixedly securing the outer cylinder to the main shaft upon rotational air cooling of the tire.

According to another feature of the present invention, there is provided the above-featured tire loading mechanism of a tire cooler for a tire vulcanizing machine, wherein the means for fixedly securing the outer cylinder to the main shaft consists of two flanges on the outer circumference of the main shaft loosely fitted in the inner circumference of the outer cylinder, an elastic ring snugly fitted between the two flanges but normally loosely fitted in the inner circumference of the outer cylinder, and means for supplying compressed air into the space between the two flanges and inside of the elastic ring to expand the elastic ring to be pressed against the inner circumference of the outer cylinder.

In other words, the characteristic feature of the present invention resides in the following points:

(1) An adjusting screw thread portion which has provided on the outside of a lower housing in the prior art is disposed above the clamped tire and inside of the outer cylinder.

(2) An air clutch (including an elastic ring) is provided between the main shaft and the outer cylinder so that they can be rotated jointly.

Owing to the above-described structural features of the present invention, the screw thread portion for adjusting bead heights is disposed within an enclosed space and cut off from air for tire cooling air. By manipulating the air clutch, either adjustment of bead height or rotation of the tire is selectively effected. The same power source is commonly used as a drive source for adjusting bead height and as a drive source for rotating a tire.

In summary, according to the present invention, the following advantages can be attained:

(1) Adjustment of bead heights is effected by means of a power source rather than by manual labor, and thereby time and labor can be saved.

(2) Since the screw thread portion can be sealingly enclosed, jamming thereof caused by tar-like substance exuded from a vulcanized tire can be prevented, and maintenance of the machine is facilitated.

(3) While the machines in the prior art necessitated three drive sources (one being manual labor), only one drive source is necessary with the invention, and economy of the machine is enhanced.

The above-mentioned and other objects, features and advantages of the present invention will become more apparent from the following description of one preferred embodiment of the invention taken in conjunction with the accompanying drawings.

DESCRIPTION OF THE PREFERRED EMBODIMENT

Figure 1:
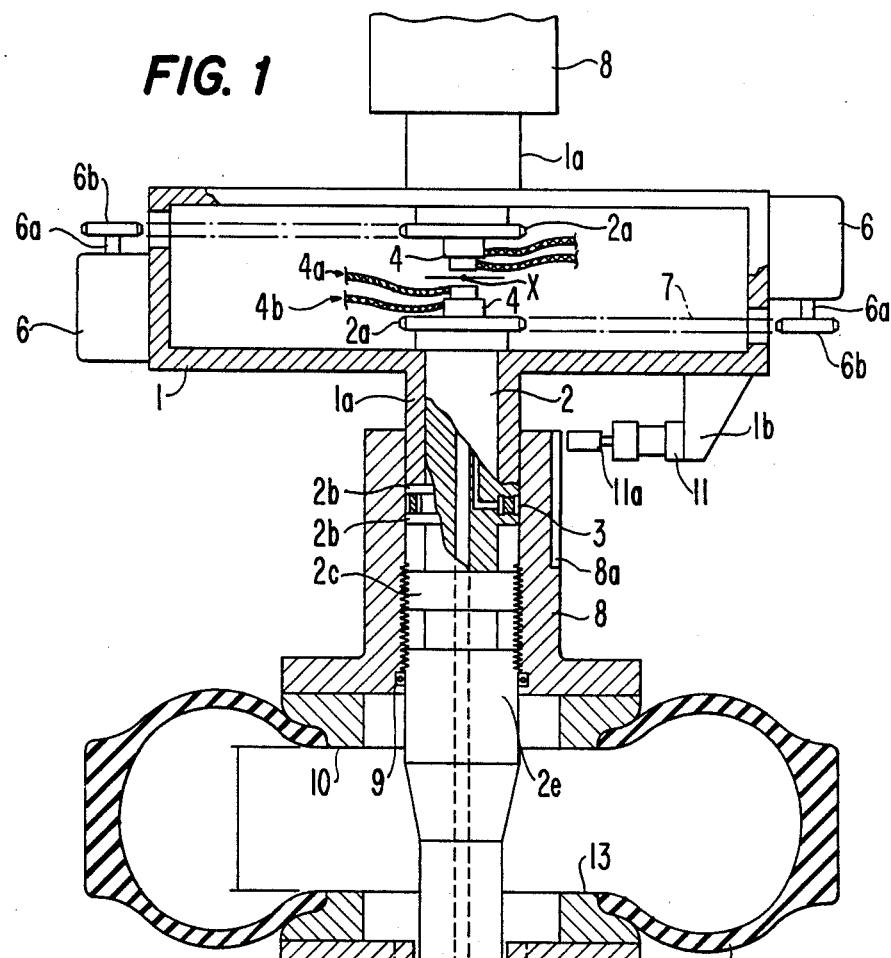
FIG. 1 is a longitudinal cross-sectional view of one preferred embodiment of the present invention.

FIG. 1 shows, in cross-section, a tire loading mechanism of a PCI (tire cooler) embodying the present invention. While a main frame, a housing elevator mechanism, a tire ejecting mechanism, etc. are present besides the illustrated construction, they are omitted from illustration because they themselves are well known.

A rotary table 1 is rotatable about a center of rotation x on a main frame, not shown. A main shaft 2 loosely fitted in an inner circumference of a bearing 1a provided on the rotary table 1 has a sprocket 2a fixedly secured at its inner or upper portion. Under or outwardly of the sprocket 2a the main shaft 2 is successively provided with two parallel flanges 2b between which an elastic ring 3 can be snugly fitted, male screw threads 2c, and a plurality of claws 2d at the bottom or outer end as shown in cross-section in FIG. 2. At the inner end or top of the main shaft 2 is mounted a rotary joint 4 having two air feed ports 4a and 4b. Compressed air fed through the air feed port 4a passes through a center bore in the main shaft 2 and is fed to the inside of a vulcanized tire 5 through a bottom opening of the main shaft 2 and a sealingly enclosed space delimited by a housing 12, an inner or upper bead ring 10, a lower or outer bead ring 13, an outer cylinder 8 and the vulcanized tire 5, to inflate the tire 5. On the other hand, compressed air fed through the air feed port 4b passes through another bore within the main shaft 2 and is fed into the space delimited by the two parallel flanges 2b and the inner circumference of the elastic ring 3 which is normally loosely fitted in the inner circumference of the outer cylinder 8 as shown in FIG. 1. Since the elastic ring 3 is snugly fitted between the two parallel flanges 2b, the compressed air serves to expand the elastic ring 3 so as to press it against the inner circumference of the outer cylinder 8. Consequently, the main shaft 2 becomes locked to the outer cylinder 8 via the expanded elastic ring 3, although the main shaft 2 could freely rotate within the outer cylinder before the feed of the compressed air through the air feed port 4b owing to loose fitting of the elastic ring 3 in the inner circumference of the outer cylinder 8 under a normal unexpanded condition. Thus the elastic ring 3 and the relevant parts act as an air clutch.

Figure 2:
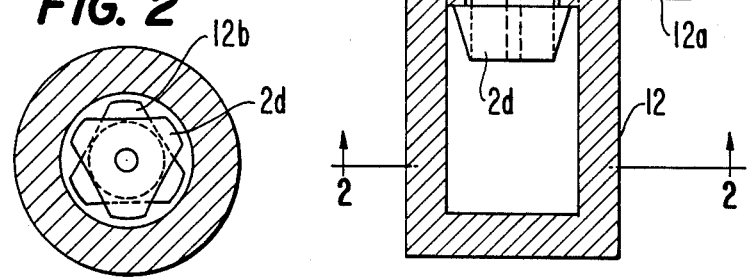
FIG. 2 is a transverse cross-sectional view of the same taken along line 2—2 in FIG. 1 as viewed in the direction of the arrows.

On a side surface of the rotary table 1 is fixedly secured by bolts or the like a motor-powered reduction gear with a motor or a geared motor 6. A sprocket 6b is fixedly secured to a shaft 6a of the geared motor 6, and sprocket 6b is coupled via a roller chain 7 to the sprocket 2a on the main shaft 2 so as to be able to rotate the main shaft 2. The outer cylinder 8 is formed in a hollow cylindrical shape having a flange at its bottom. The upper portion of the inner circumference of the outer cylinder 8 is loosely fitted around the outer circumference of the bearing 1a of the rotary table 1 and the outer circumferences of the two parallel flanges 2b of the main shaft 2. Female screw threads provided on the lower portion of outer cylinder 8 are engaged with mail screw threads 2c on the main shaft 2. Furthermore, the inner surface of the lower portion of the outer cylinder 8 is loosely fitted around a circular column portion 2e of the main shaft 2, and is provided with an annular groove in which an O-ring 9 can be mounted. In addition, on the lower surface of the flange at the bottom of the outer cylinder 8 is fixedly secured by bolts or the like the upper bead ring 10. Longitudinal grooves 8a are formed on the outer surface of the upper half of the outer cylinder 8. A hydraulic cylinder 11 is fixedly secured by means of bolts or the like to a bracket 1b formed integrally with the rotary table 1, and a claw 11a at the tip end of a piston rod of the cylinder 11 is selectively engaged with the grooves 8a on the outer cylinder 8. Lower bead ring 13 is fixedly secured by means of bolts or the like to the upper surface of a flange 12a at the top of the housing 12. As seen in FIG. 2, at the central portion of the housing 12 is formed a hole of such configuration that the plurality of claws 2d provided on the main shaft 2 can pass through or can be locked within such hole.

FIG. 1 is depicted under the assumption that in a PCI which already has received a vulcanized tire 5, the tire 5 has been inflated by a compressed air feed through the air feed port 4a of the rotary joint 4. (Rotation of the rotary table 1 is omitted from illustration.)

Thereafter, if compressed air is fed through the air feed port 4b of the rotary joint 4, the elastic ring 3 inflates towards the outer circumference and comes into tight contact with the inner circumferential surface of the outer cylinder 8, and thereby the main shaft 2 and the outer cylinder 8 are held in a locked condition.

Then, when electric current is supplied to the geared motor 6, the tire 5 is rotated. After natural cooling for a predetermined period, the geared motor 6 is stopped, and air is discharged through the air feed ports 4a and 4b. The tire 5 thus is deflated, and the elastic ring 3 contracts.

Subsequently, a hydraulic switch for the hydraulic cylinder 11 is activated to move the claw 11a leftwards as viewed in FIG. 1, and thereby the claw 11a is engaged with the groove 8a on the outer cylinder 8. At the same time, the housing 12 is raised by means of a housing elevator means, not shown, electric current is supplied to the geared motor 6 to rotate the main shaft 2 by an appropriate angle (until the claws 2d at the bottom of the main shaft 2 have been rotated about 60 degrees and have been aligned with the hole 12b in the housing 12), and thereafter the housing 12 is lowered. The housing 12 thus is disengaged from the main shaft 2, and the tire 5 can be discharged. Subsequently, the next vulcanized tire 5 is received by the illustrated tire cooler, and subsequent operations are carried out just the inverse to those described above.

On the other hand, in the event that it is necessary to change the dimension indicated by the arrow in FIG. 1, to accommodate a tire of different size, if the claw 11a of the hydraulic cylinder 11 is moved leftwards to restrain the rotation of the outer cylinder 8 and the geared motor 6 is rotated by a predetermined angle in the predetermined direction, they by the action of the male screw threads 2c formed on the main shaft 2, the dimension d between the upper and lower bead rings 10 and 13 can be varied.

As will be apparent from the detailed description above, the present invention provides a main shaft pivotably supported from a rotary table and rotationally driven by a drive source, an outer cylinder mounted to the main shaft so as to be relatively displaceable in an axial direction via screw threads and having an upper bead ring support flange at its lower end, a housing mounted to the lower end of the main shaft via disengageably fitting claws and having a lower bead ring support flange at its upper end, a disengageably fitting rod for stopping rotation of the outer cylinder and provided on the rotary table at a position opposed to a vertical groove on the surface of the outer cylinder, and means provided between the mainshaft and the outer cylinder for fixedly securing the outer cylinder to the main shaft upon rotational air cooling of the tire. Accordingly, the following advantages can be obtained:

(1) By merely additionally providing an appropriate anti-rotation mechanism, drive sources necessary for respective functions in the prior art can be replaced by a single drive source, and thereby the cost of the structure can be reduced.

(2) Accordingly, saving of auxiliary instruments such as respective detector mechanisms or the like can be achieved.

(3) At the same time, the problem of locking threaded portions, which has been considered to be impossible in the prior art, can be resolved.

(4) The necessity of preparing a large number of spacers for adjusting bead heights is eliminated, and also the invention can contribute to saving of labor and improvements in safety of operation.

While a principle of the present invention has been described above in connection to one preferred embodiment of the invention, it is a matter of course that many apparently widely different embodiments of the invention can be made without departing from the spirit of the invention.

What is claimed is:

1. A tire loading mechanism of a tire cooler for a tire vulcanizing machine, comprising a main shaft pivotably supported from a rotary table and rotationally driven by a drive source, an outer cylinder mounted to said main shaft so as to be relatively displaceable in an axial direction via screw threads and having an upper bead ring support flange at its lower end, a housing mounted to the lower end of said main shaft via disengageably fitting claws and having a lower bead ring support flange at its upper end, a disengageably fitting rod for stopping rotation of the outer cylinder, that is provided on said rotary table as opposed to a vertical groove on the surface of said outer cylinder, and means provided between said main shaft and said outer cylinder for fixedly securing the outer cylinder to the main shaft upon rotational air cooling of the tire 2. A tire loading mechanism of a tire cooler for a tire vulcanizing machine as claimed in claim 1, wherein said means for fixedly securing the outer cylinder to the main shaft consists of two flanges on the outer circumference of said main shaft loosely fitted in the inner circumference of said outer cylinder, an elastic ring snugly fitted between said two flanges but normally loosely fitted in the inner circumference of the outer cylinder, and means for supplying compressed air into the space between the two flanges and inside of said elastic ring to expand the elastic ring to be pressed against the inner circumference of said outer cylinder.

* * * * *